United States Patent
Vega et al.

(10) Patent No.: US 11,586,478 B2
(45) Date of Patent: Feb. 21, 2023

(54) SWARM-BASED RESOURCE MANAGEMENT

(71) Applicant: International Business Machines Corporation, Armonk, NY (US)

(72) Inventors: Augusto Vega, Mount Vernon, NY (US); Alper Buyuktosunoglu, White Plains, NY (US); Pradip Bose, Yorktown Heights, NY (US); Vaidyanathan Srinivasan, Bangalore (IN); Ranjal Gautham Shenoy, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1154 days.

(21) Appl. No.: 16/107,201

(22) Filed: Aug. 21, 2018

(65) Prior Publication Data

US 2020/0065686 A1  Feb. 27, 2020

(51) Int. Cl.
*G06F 9/50* (2006.01)
*G06N 20/00* (2019.01)
*G06N 5/043* (2023.01)

(52) U.S. Cl.
CPC .......... *G06F 9/5083* (2013.01); *G06F 9/5044* (2013.01); *G06F 9/5061* (2013.01); *G06N 20/00* (2019.01); *G06N 5/043* (2013.01)

(58) Field of Classification Search
CPC .... G06F 9/5083; G06F 9/5044; G06F 9/5061; G06N 20/00; G06N 5/043
See application file for complete search history.

(56) References Cited

U.S. PATENT DOCUMENTS

| | | | |
|---|---|---|---|
| 7,930,578 B2 | 4/2011 | Bose et al. | |
| 9,477,524 B2 | 10/2016 | Kang | |
| 9,753,778 B2 | 9/2017 | Guha et al. | |
| 9,959,139 B2 | 5/2018 | Kang | |
| 10,452,117 B1* | 10/2019 | Becker | G06F 1/3243 |
| 2014/0082380 A1* | 3/2014 | Schluessler | G06F 1/3296 |
| | | | 713/300 |
| 2015/0355692 A1* | 12/2015 | Paul | G06F 1/3203 |
| | | | 713/322 |
| 2017/0090483 A1 | 3/2017 | Smith et al. | |

(Continued)

OTHER PUBLICATIONS

Nelson, et al., "Distributed Power Management of Real-time Applications on a GALS Multiprocessor SOC," © 2015 IEEE, 10 pages.

(Continued)

*Primary Examiner* — Sisley N Kim
(74) *Attorney, Agent, or Firm* — Amin, Turocy & Watson, LLP

(57) ABSTRACT

Systems, computer-implemented methods and/or computer program products that facilitate management of resources are provided. In one embodiment, a computer-implemented method comprises: employing, by a system operatively coupled to a processor, at least one model to predict respective token needs by a set of processing elements during execution of a workload; and exchanging, by the system, one or more tokens between a subset of the processing elements as a function of the predicted token needs.

25 Claims, 9 Drawing Sheets

(56) References Cited

U.S. PATENT DOCUMENTS

2019/0204894 A1* 7/2019 Jahagirdar .............. G06F 1/324

OTHER PUBLICATIONS

IBM, "An Approach for the Efficient Administration and Scheduling of Computational Kernels on Cell BE Multi-Core Processors—SPE Kernel Chaining," Original Publication Date: Apr. 3, 2009, 17 pages.
IBM, "Optimizing Systems Management using Swarm Intelligence Principles," Original Publication Date: Jul. 20, 2009, 5 pages.
Anonymous, "Method and apparatus for scalable performance simulations of multi core processor systems and disk storage in clouds," Original Publication Date: Apr. 18, 2011, 4 pages.
Sethia, "Dynamic Hardware Resource Management for Efficient Throughput Processing," © 2015, 146 pages.
Lardieri, et al., "A Multi-layered Resource Management Framework for Dynamic Resource Management in Enterprise DRE Systems," Dec. 26, 2006, 20 pages.
openpowerfoundation.org, "On Chip Controller (OCC)," Retrieved, Jun. 8, 2018, 4 pages.
Cebrían, et al., "Power Token Balancing: Adapting CMPs to Power Constraints for Parallel Multithreaded Workloads," 2011 IEEE International Parallel & Distributed Processing Symposium, 12 pages.
Rotem, et al., "Power-Management Architecture of the Intel Microarchitecture Code-Named Sandy Bridge," © 2012 IEEE, 8 pages.

* cited by examiner

SWARM-BASED RESOURCE MANAGEMENT

STATEMENT REGARDING FEDERALLY SPONSORED RESEARCH OR DEVELOPMENT

This invention was made with Government support under HR0011-13-C-0022 awarded by Defense Advanced Research Projects Agency (DARPA). The Government has certain rights in this invention.

BACKGROUND

The subject disclosure relates to swarm-based resource management, and more specifically, swarm-based resource management in systems with multiple processing elements. A common approach to management of large systems with multiple processing elements is to employ a centralized management system, e.g., On Chip Controller, to manage computing resources (e.g., processing frequency, power consumption, temperature, etc.) in order to maximize performance and minimize energy usage. However, such centralized management systems can have scalability issues as the number of processing elements (e.g. compute cores) increases. Swarm intelligence has been used in decentralize, self-organized system that follows simple swarm intelligence rules. However, a decentralized, self-organized system that employs swarm intelligence does not predict resource utilization and continue to make improvements nor does it guarantee that the system as a whole does not consume more resources than available.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, apparatuses, and/or computer-implemented methods that facilitate management of resources are described.

According to an embodiment, a system for management of resources is provided. The system can comprise a token allocation component that employs at least one model to predict respective token needs by a set of processing elements during execution of a workload. The system can further comprise a processing element management component that exchanges one or more tokens between a subset of the processing elements as a function of the predicted token needs. Advantages of employing at least one model to predict respective token needs is that swarm intelligence can be used to make efficiency improvements thereby minimizing token shortfall and guaranteeing that the system as a whole does not consume more resources than available.

In some embodiments, the processing element management component can measure benefits obtained by the set of processing elements that exchanged the one or more tokens to adjust the exchange of the one or more tokens. Advantages of measuring benefits obtained by the set of processing elements that exchanged the one or more tokens is that it facilitates learning and improving the one or more models used to predict respective token needs.

According to another embodiment, a computer-implemented method is provided. The computer-implemented method can comprise employing, by a system operatively coupled to a processor, at least one model to predict respective token needs by a set of processing elements during execution of a workload. The computer-implemented method can further comprise exchanging, by the system, one or more tokens between a subset of the processing elements as a function of the predicted token needs. Advantages of employing at least one model to predict respective token needs is that swarm intelligence can be used to make efficiency improvements thereby minimizing token shortfall and guaranteeing that the system as a whole does not consume more resources than available.

In some embodiments, the computer-implemented method can further comprise measuring, by the system, benefits obtained by the set of processing elements that exchanged the one or more tokens to adjust the exchange of the one or more tokens. Advantages of measuring benefits obtained by the set of processing elements that exchanged the one or more tokens is that it facilitates learning and improving the one or more models used to predict respective token needs.

According to another embodiment, a computer program product for facilitating management of resources is provided. The computer program product can comprise a computer readable storage medium having program instructions embodied therewith. The program instructions can be executable by a processing element to cause the processing element to employ at least one model to predict respective token needs by a set of processing elements during execution of a workload. The program instructions can further be executable by a processing element to cause the processing element to exchange one or more tokens between a subset of the processing elements as a function of the predicted token needs. Advantages of employing at least one model to predict respective token needs is that swarm intelligence can be used to make efficiency improvements thereby minimizing token shortfall and guaranteeing that the system as a whole does not consume more resources than available.

In some embodiments, the program instructions can further be executable by a processing element to cause the processing element to measure benefits obtained by the set of processing elements that exchanged the one or more tokens to adjust the exchange of the one or more tokens. Advantages of measuring benefits obtained by the set of processing elements that exchanged the one or more tokens is that it facilitates learning and improving the one or more models used to predict respective token needs.

According to an embodiment, a system for management of resources is provided. The system can comprise a token allocation component that employs at least one artificial intelligence model to predict respective token needs by a set of processing elements during execution of a workload. The system can further comprise a processing element management component that exchanges one or more tokens between a subset of the processing elements as a function of the predicted token needs. Advantages of employing at least one model to predict respective token needs is that swarm intelligence can be used to make efficiency improvements thereby minimizing token shortfall and guaranteeing that the system as a whole does not consume more resources than available.

According to another embodiment, a computer-implemented method is provided. The computer-implemented method can comprise employing, by a system operatively coupled to a processor, at least one artificial intelligence model to predict respective token needs by a set of processing elements during execution of a workload. The computer-implemented method can further comprise exchanging, by the system, one or more tokens between a subset of the processing elements as a function of the predicted token needs. Advantages of employing at least one model to predict respective token needs is that swarm intelligence can be used to make efficiency improvements thereby minimizing token shortfall and guaranteeing that the system as a whole does not consume more resources than available.

DETAILED DESCRIPTION

Figure 1:
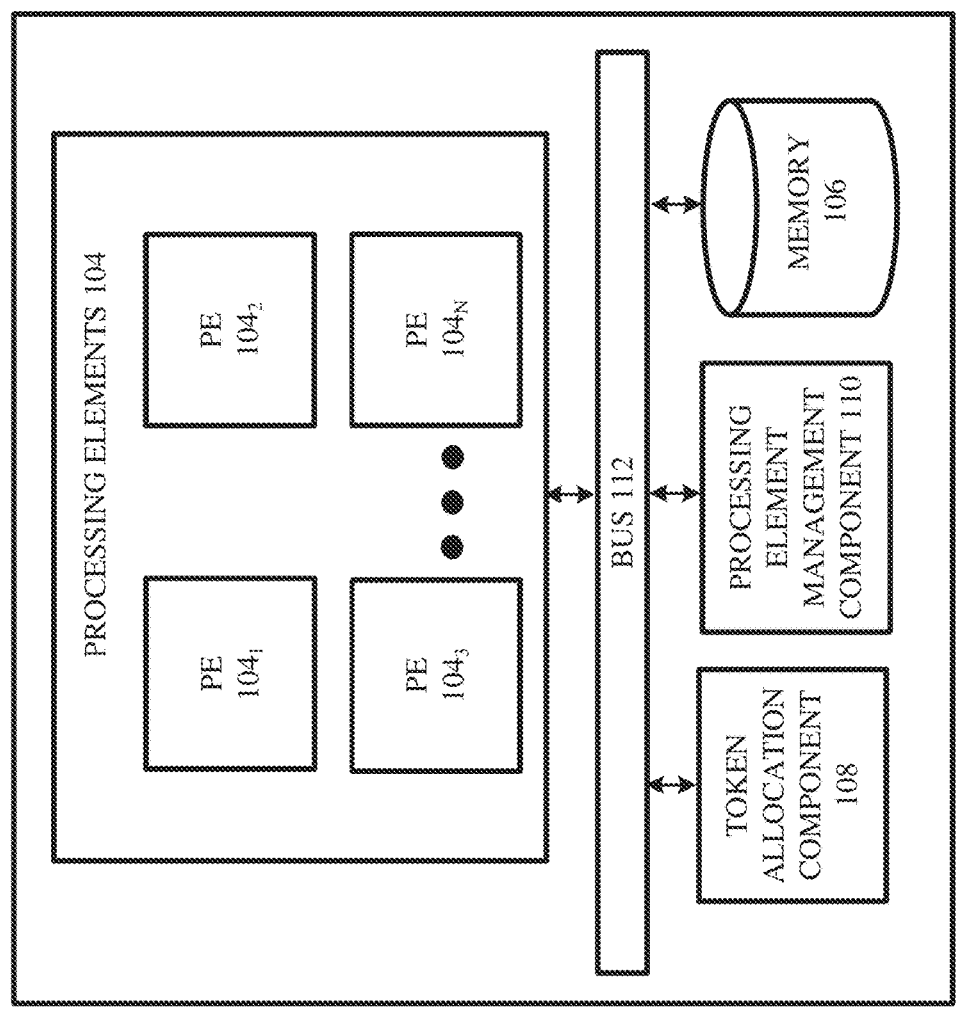
FIG. 1 illustrates a block diagram of an example, non-limiting system that facilitates management of resources in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

The subject disclosure is directed to systems, devices, apparatuses, and/or computer-implemented methods that facilitate management of resources, and more specifically, using artificial intelligence (AI) models to guide token exchange between processing elements to modulate assignment of resources. As used herein, processing elements can be stationary processing elements such as processing cores in a chip multi-processor, multi-core processors, computing cores, or computing systems in a computer cluster or datacenter. In some embodiments, artificial intelligence such as a combination of machine learning, deep learning, swarm intelligence, etc., can be employed to facilitate management of resources such as power, thermal, temperature, performance or any resources not mentioned here. In scale-out scenarios, power or thermal management can imply a major challenge due to limited scalability. Aspects of the embodiments herein describe a token-based fully-decentralized resource management architecture, where the number of tokens "owned" by a processing element can determine its maximum frequency or voltage setting. Tokens can be exchanged in an intelligent manner using artificial intelligence (AI) principles such as deep learning or swarm intelligence. For example, a processing element can proactively determine to retain or release tokens based on the predicted processing element's utilization or needs. A processing element can also learn over time more efficient token exchange patterns (e.g., number of exchanged tokens, neighbors to exchange with, etc.) An operating system can assist the processing elements in this prediction and learning process.

A system with multiple processing elements can be a single computing component with two or more independent actual processing elements, which can be units that read and/or execute program instructions. Multiple processing elements can run multiple instructions at the same time, increasing overall speed for programs amenable to parallel computing. In other embodiments, the voltage or frequency setting for the processing elements can be determined during run-time based on calibration of the processing elements performance for different workloads.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

FIG. 1 illustrates a block diagram of an example, non-limiting system 100 that facilitates management of resources in accordance with one or more embodiments described herein. Aspects of systems (e.g., system 100 and the like), apparatuses or processes explained in this disclosure can constitute machine-executable components embodied within machines, e.g., embodied in one or more computer readable mediums (or media) associated with one or more machines. Such components, when executed by the one or more machines, e.g., computers, computing devices, virtual machines, etc. can cause the machines to perform the operations described.

As shown in FIG. 1, system 100 can include a plurality (e.g., two or more) of processing elements 104. In various implementations, the processing elements 104 can execute instructions of computer programs by performing the basic arithmetic, logical, control and input/output (I/O) operations specified by the instructions. The system 100 can further include memory 106 to store the instructions. The system 100 can further include token allocation component 108 and processing element management component 110. The system 100 can further include bus 112 that electrically and communicatively connects the various hardware and software components of the system 100, including but not limited to, the processing elements 104, the respective processing elements 104, the memory 106, the token allocation component 108 and the processing element management 110. It should be appreciated that although not shown, the system 100 can include various additional hardware and software components that facilitate performance of various operations of the processing elements 104 which can vary depending on the type and features/functionalities of the system 100. More specifically, the processing elements 104 can utilize various hardware and software components such of the ones described herein to facilitate management of resources.

In some implementations, the processing elements 104 can be homogenous. According to these implementations, the respective processing elements 104 can include same or substantially the same hardware configurations, be configured to operate using the same or substantially the same operating frequency capacity, be configured to operate using the same or substantially the same voltage capacity, and/or can be configured to perform the same or substantially the same computational tasks. In other implementations, the respective processing elements 104 can be heterogeneous. According to these implementations, at least one of the respective processing elements 104 can: include a different hardware configuration relative to another processing element of the respective processing elements 104, be configured to operate using a different operating frequency capacity relative to the other processing element of the respective processing elements 104, be configured to operate using a different voltage capacity relative to the other processing element of the respective processing elements 104, and/or be configured to perform a different specialized computational task relative to the other processing element of the respective processing elements 104.

It should be appreciated that the number of processing elements 104 can vary from 1 to N, wherein N is an integer greater than 1. The processing elements 104 can exhibit different resource utilization levels during workload (e.g., computational task) execution such as low, normal and high. One or more embodiments herein can keep processing elements 104 at a normal utilization level by enabling and disabling processing element resources at runtime (e.g., via dynamic frequency scaling). To enable resources, the processing elements 104 can obtain tokens. The processing elements 104 can release tokens when resources are not enabled. The total number of tokens in the system 100 can be fixed, and the tokens can be evenly distributed across the processing elements at the beginning of a workload.

In various embodiments, the token allocation component 108 can employ at least one model to predict respective token needs by a set of processing elements 104 during execution of a workload. By employing at least one model to predict respective token needs, the system can provide solutions to problems of conventional systems by minimizing token shortfall and preventing the system from consuming more resources than available using swarm intelligence. The model can be an AI model. The AI models can be used to guide information exchange between the processing elements 104 in order to improve a metric of interest. The exchange of information can be in the form of tokens or processing element level state information (e.g., power efficiency). The metric of interest that can be improved can be power efficiency, temperature or system reliability. The number of tokens can determine the attainable P-state (e.g., operational state). The higher the number of tokens, the higher the frequency-voltage pair that can be set.

The model can be machine learning models, deep learning models, swarm intelligence models, etc. For example, five heuristics that the model can be based on can include disabling token exchange or enabling token exchange in different ways. Disabling token exchange can mean that the token exchange between the processing elements 104 is not enabled or that the number of tokens is fixed and the same across the processing elements 104. One version of enabling token exchange can include, at an iteration and if needed, the processing elements 104 can request the number of needed tokens from its neighbors. As used herein, the term "neighbors," "neighboring" and "proximate" can be used interchangeably to mean physically proximate or socially proximate. Proximate processing elements 104 can be in the vicinity of the requesting processing element in the sense that the processing elements 104 are physically proximate (e.g., directly connected) or socially proximate (e.g., sharing a workload or part of a code). For example, neighbors can mean physical neighbors on four sides. Neighbors can also mean sharing a workload or part of a code although physically far apart. Another version of enabling token exchange can include, at an iteration and if needed, the processing elements 104 can request only one token from its neighbors. Another version of enabling token exchange can include, at an iteration and if needed, the processing elements 104 can request only one token from a neighbor with the highest number of tokens unused (if it exists). Another version of enabling token exchange can include, at an iteration, a processing element 104 and its neighbors can distribute the available tokens in the group across the five cores in the fairest possible way (e.g., based on needs).

The processing element management component 110 can exchange one or more tokens between a subset of the processing elements 104 as a function of the predicted token needs. An individual processing element $104_N$ can employ a processing element management component 110 or share a processing element management component 110 with one or more other processing elements 104. The exchange of the one or more tokens can be based on resource utilization to improve power efficiency, temperature or system reliability. Local consensus for fairer token distribution can be based on the equation $$\frac{Ni}{N} \times T$$

to determine the number of tokens a processing element 104 gets. $N_i$ can represent the number of tokens needed by processing element i (e.g., processing element $104_N$) based on current utilization. N can represent the total number of needed tokens in the group (e.g., formed with its neighbors). N can be the sums of the $N_i$ within a group. T can represent the total number of tokens in the group. T can be the sum of $T_i$, tokens available in processing element i. During execution of a workload, the processing elements 104 can have a surplus of tokens (e.g., more tokens available than needed). The processing elements 104 can have the exact number of tokens for the current utilization level. The processing elements 104 can also have a shortfall of tokens (e.g., more tokens needed than available). The embodiments herein can minimize the shortfall of tokens so the processing elements 104 can spend less time as possible in shortfall situations. Ideally, the processing elements 104 should have the exact number of needed tokens all the time. The version of enabling token exchange that includes, at an iteration, a processing element 104 and its neighbors can distribute the available tokens in the group across the five cores in the fairest possible way (e.g., based on needs) can virtually eliminate the shortfall situation using local communication and token exchange as compared to other versions of enabling token exchange.

After exchanging tokens, the processing element management component 110 can measure benefits obtained in return (e.g., power efficiency improvement) and use this feedback to adjust the way the processing elements 104 exchange tokens. The processing element management component 110 can measure benefits obtained by the set of processing elements 104 that exchanged the one or more tokens to adjust the exchange of the one or more tokens. By measuring benefits obtained by the set of processing elements 104 that exchanged the one or more tokens, the system 100 provides solutions to problems of conventional systems by facilitating learning and improving the one or more models used to predict respective token needs. The processing element management component 110 can exchange the one or more tokens between a pair of processing elements 104 that are directly connected within the set of processing elements or that share commonality of execution of the workload. The pair of processing elements that are directly connected or that share commonality of execution have an associated strength level. Connections between pairs of processing elements 104 or links between two neighboring processing elements i and j (e.g., processing elements 104) can have an associated strength level (e.g., a parameter) $S_{ij}$ with values between 0.0 and 1.0. The processing element can request tokens from its neighbor with the highest strength level. The actual number of tokens exchanged can be the number of tokens requested and scaled by $S_{ij}$. If the token exchange results in an efficiency improvement for both neighboring processing elements 104, then $S_{ij}$ can be increased or doubled, saturating at 1.0. If the token exchange results in an efficiency degradation for both neighboring cores, then $S_{ij}$ can be decreased or halved, saturating at 0.0. Every time a new task or workload is scheduled or begin in the processing element 104, the strength level between associated links can also be reset to 1.0.

The processing element management component 110 can also initiate reallocation of the one or more tokens based on detection of a new execution phase of a running workload is detected. More specifically, the processing elements 104 can utilize the processing element management component 110 to initiate reallocation of resources (e.g., in the form of token exchange) and request assistance from neighboring processing elements 104 when a new execution phase of a running workload is detected. The processing element management component 110 can exchange the one or more tokens available proportional to the one or more tokens needed by the set of processing elements. More specifically, the processing elements 104 can utilize the processing element management component 110 to dynamically distribute the tokens available with neighboring processing elements 104 proportional to the tokens needed by a respective processing element $104_N$.

The processing element management component 110 can also exchange the one or more tokens through a ring interconnect. Rather than having four physical neighbors in a mesh-configuration, the processing elements 104 in a ring interconnect has right and left neighbors, and otherwise, the functionality between the different configurations can be the same. An individual processing element $104_N$ can employ a processing element management component 110 or share a processing element management component 110 with one or more other processing elements 104. The processing element management component 110 can administer tokens locally within a ring interconnect or between ring interconnects for processing elements that share a workload or code. The number of tokens can determine the attainable P-state (e.g., operational state). The higher the number of tokens, the higher the frequency-voltage pair that can be set. The processing element management component 110 can have two associated values, $T_{available}$ and $T_{needed}$. $T_{available}$ can be the number of tokens available at the processing element management component 110 for the one or more processing elements 104. $T_{needed}$ can be the number of tokens needed by the processing element management component 110 for the one or more processing elements 104.

The processing element management component 110 needing the one or more tokens can inject a token request in the ring interconnect and the processing element management component 110 having the one or more tokens available can inject one or more token responses upon reception of the token request. If a processing element management component 110 needs additional tokens, the processing element management component 110 can insert a request in the ring. As the request travels through the ring, other processing element management component 110 can contribute spare tokens. If needed, any processing element management component 110 in between can take tokens from the ring and not necessarily by the processing element management component 110 that requested the tokens. While token exchange is employed to facilitate power shifts between processing elements 104, the power consumption does not surpass the total number of tokens. In a ring interconnect, only one token packet circulates across the ring interconnect at any point in time. The token packet payload can be a positive or negative number of tokens. If the token packet payload is positive, the token packet is a token request. If the token packet payload is negative, the token packet contains spare tokens. Multiple token requests can be aggregated in a single token packet.

Figure 2:
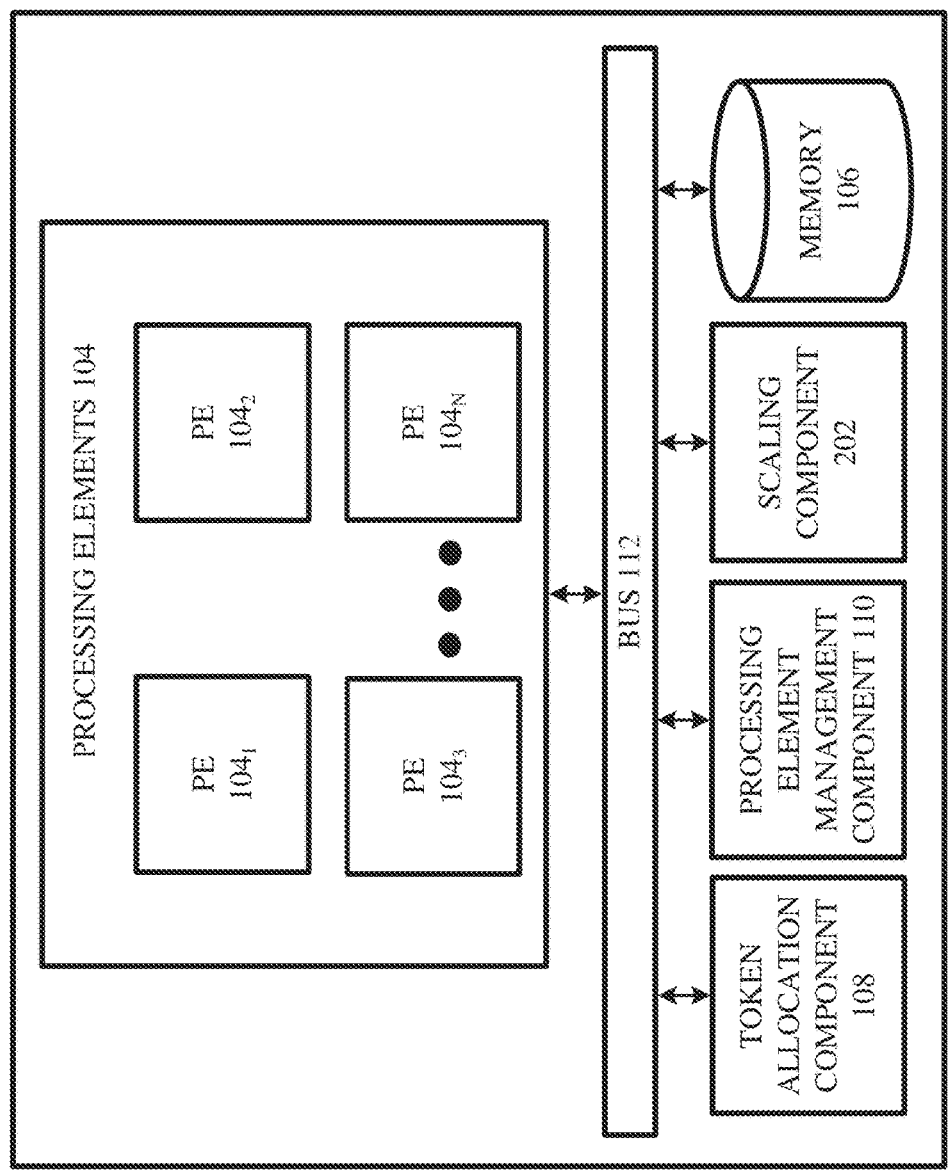
FIG. 2 illustrates a block diagram of an example, non-limiting system that facilitates management of resources including a scaling component in accordance with one or more embodiments described herein.

FIG. 2 illustrates a block diagram of an example, non-limiting system 100 that facilitates management of resources including a scaling component 202 in accordance with one or more embodiments described herein. The scaling component 202 can provide solutions to problems of conventional systems by making adjustments based on efficiency improvement and efficiency degradation results to continue to further provide improvements. The scaling component 202 can measure and adjust the power consumption of the set of processing elements 104 at runtime of the workload. For example, the scaling component 202 can perform dynamic adjustment of the operating frequency and voltage of the set of processing elements 104 at runtime of the workload. A processing element $104_N$ of the set of processing elements 104 can consume up to a defined amount of power, which can be proportional to a number of tokens owned by the respective processing element $104_N$. More specifically, a processing element $104_N$ can consume a maximum amount of power that is proportional to the number of tokens owned by the processing element $104_N$. The scaling component 202 can scale the number of tokens exchanged (e.g., via the processing element management component 110) between the pair of processing elements 104 (e.g., neighboring processing elements 104) based on the strength level associated with the efficiency of resource allocation between the pair of processing elements 104. More specifically, the number of tokens exchanged between two connected or neighboring processing elements 104 can be scaled by the strength level of the connection between them. Links or connections between two neighboring processing elements i and j (e.g., processing elements 104) can have an associated strength level (e.g., a parameter) $S_{ij}$ between 0.0 and 1.0. A processing element $104_N$ can request tokens from neighboring processing elements 104 with the highest strength level. The actual number of tokens exchanged (e.g., via the processing element management component 110) can be the number of tokens requested scaled by $S_{ij}$. The scaling component 202 can increase or decrease the strength level between the pair of processing elements 104 as a function of benefits obtained after the exchange of tokens between the pair of processing elements 104. If the token exchange results in an efficiency improvement for the pair of processing elements 104 (e.g., neighboring processing elements 104), then $S_{ij}$ can be increased (e.g., doubled), saturating at 1.0. If the token exchange results in an efficiency degradation for the pair of processing elements 104, then $S_{ij}$ can be decreased (e.g., halved), saturating at 0.0.

Figure 3:
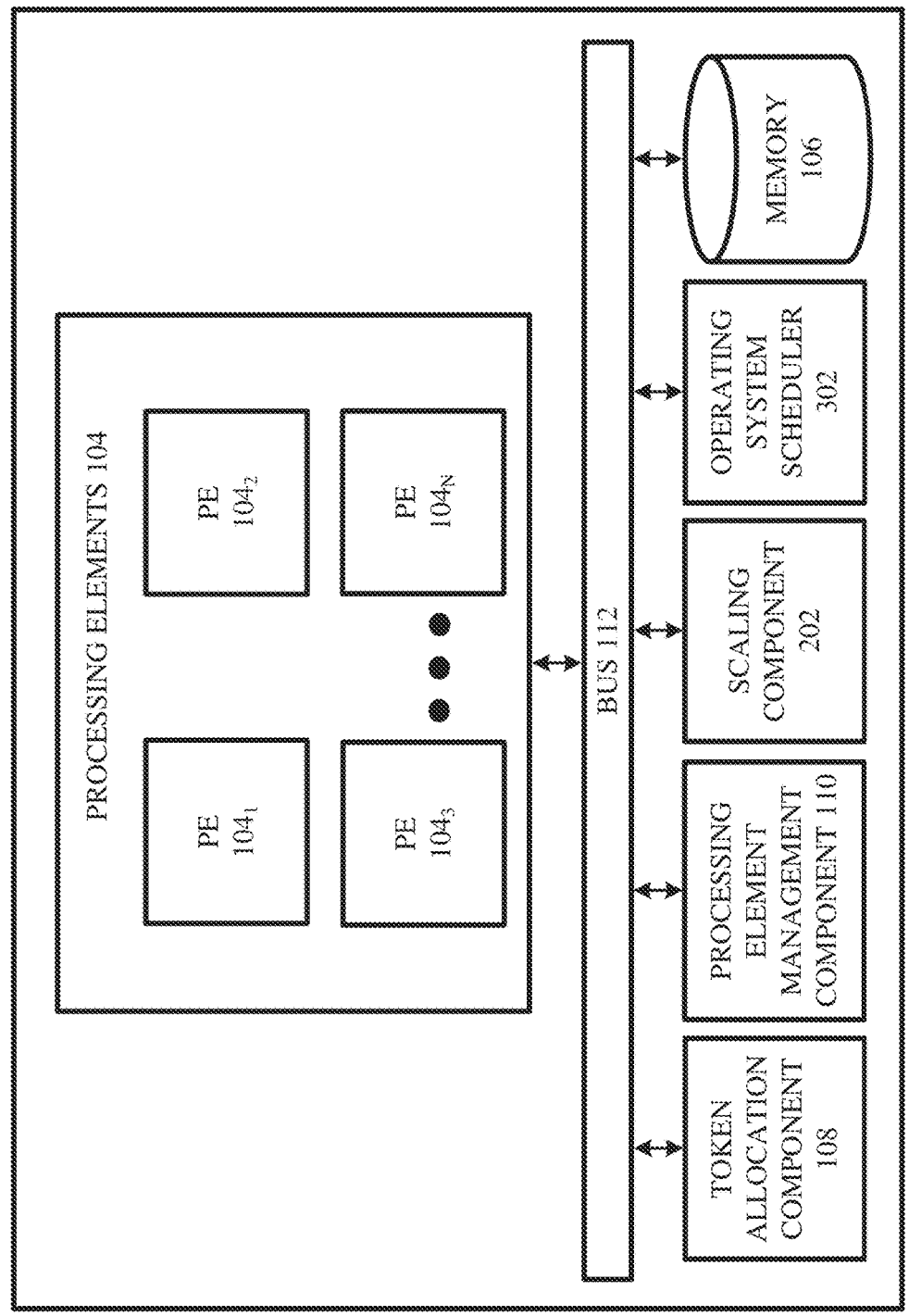
FIG. 3 illustrates a block diagram of an example, non-limiting system that facilitates management of resources including an operating system scheduler in accordance with one or more embodiments described herein.

FIG. 3 illustrates a block diagram of an example, non-limiting system 100 that facilitates management of resources including an operating system scheduler 302 in accordance with one or more embodiments described herein. The operating system scheduler 302 can provide solutions to problems of conventional systems by resetting the strength level of associated links with the scheduling of new tasks so that efficiency improvements can be accurately assessed. An operating system scheduler 302 can reset the strength level between the pair of processing elements 104 based on determination by the operating system scheduler 302 that a new workload is scheduled. The operating system scheduler 302 can also schedule a new task or workload in a processing element 104$_N$. Every time the operating system scheduler 302 schedules a new task in a particular processing element 104$_N$, the operating system scheduler 302 can also reset the strength level to 1.0 for all its associated links (e.g., links or connections between neighboring processing elements 104). Links or connections between neighboring processing elements i and j (e.g., processing elements 104) have an associated strength level (e.g., a parameter) $S_{ij}$ between 0.0 and 1.0. The processing elements 104 can request (e.g., via the processing element management component 110) tokens from neighboring processing elements with the highest strength level. The actual number of tokens exchanged (e.g., via the processing element management component 110) can be the number of tokens requested (e.g., via the processing element management component 110) and scaled (e.g., via the scaling component 202) by $S_{ij}$. If the token exchange results in an efficiency improvement for both processing elements 104, then $S_{ij}$ is increased (e.g., doubled), saturating at 1.0. If the token exchange results in an efficiency degradation for both processing elements 104, then $S_{ij}$ is decreased (e.g., halved), saturating at 0.0.

Figure 4:
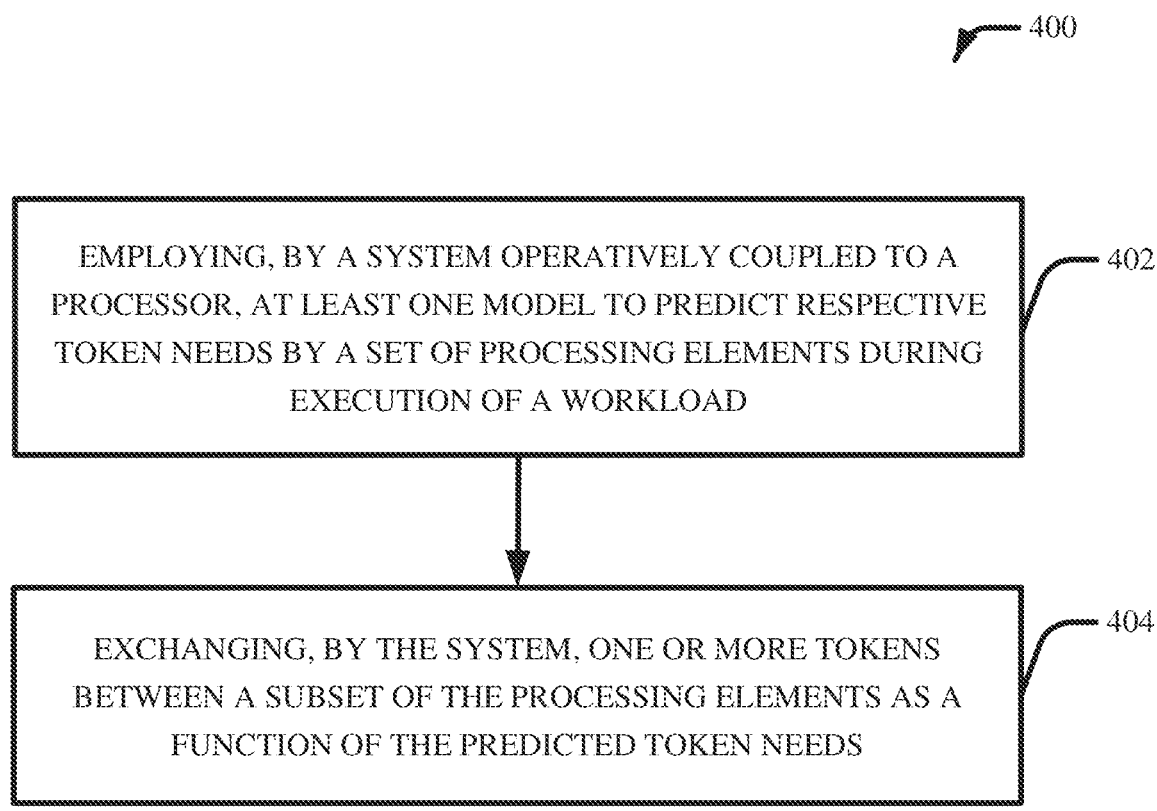
FIG. 4 illustrates a flow diagram of an example, non-limiting computer-implemented method that facilitates management of resources in accordance with one or more embodiments described herein.

FIG. 4 illustrates a flow diagram of an example, non-limiting computer-implemented method 400 that facilitates management of resources in accordance with one or more embodiments described herein. At 402, the computer-implemented method 400 can comprise employing (e.g., via the token allocation component 108), by a system operatively coupled to a processor, at least one model to predict respective token needs by a set of processing elements during execution of a workload. At 404, the computer-implemented method 400 can comprise exchanging (e.g., via the processing element management component 110), by the system, one or more tokens between a subset of the processing elements as a function of the predicted token needs.

Figure 5:
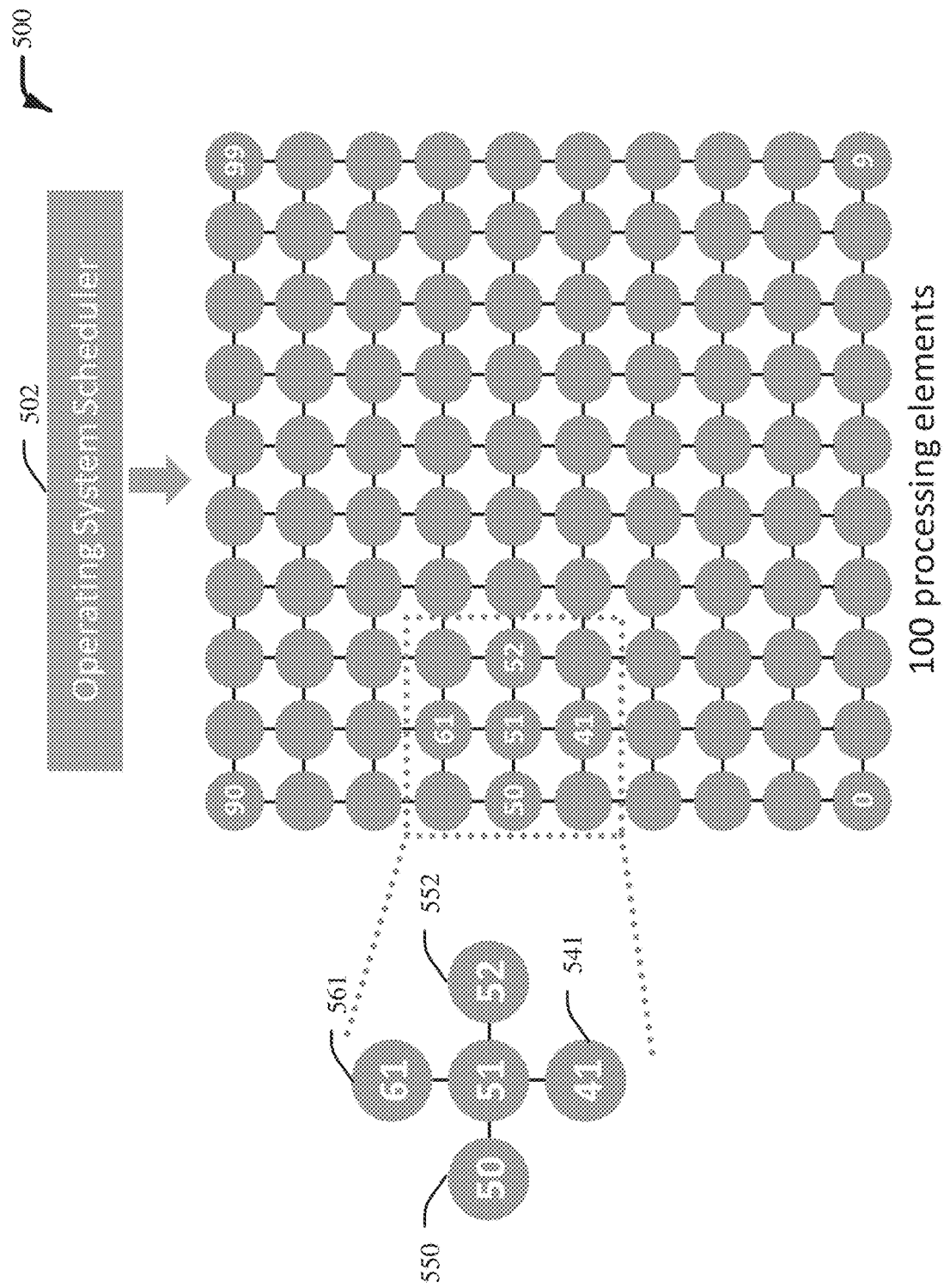
FIG. 5 illustrates a block diagram of an example, non-limiting many-processing element system in accordance with one or more embodiments described herein.

FIG. 5 illustrates a block diagram of an example, non-limiting many-processing element system 500 in accordance with one or more embodiments described herein. The example, non-limiting many-processing element system 500 illustrates 100 processing elements in a mesh configuration with the processing elements (e.g., processing elements 104) having four physically adjacent neighbors. These processing elements can exhibit different resource utilization levels during workload execution such as low, normal and high. The goal is to keep the processing elements at a normal utilization level by enabling and disabling at runtime resources within the processing element and/or via dynamic frequency scaling. Token exchange between processing elements can be turned off, in which case the number of tokens is fixed and the same across the processing elements. An example of an enabled token share that facilitates a fairer token distribution can include, at an iteration, the processing element and its four neighbors distribute the available tokens in the group across the five processing elements in the fairest possible way (e.g., based on needs). For example, FIG. 5 illustrates processing element 551 having neighboring processing elements 541, 550, 552 and 561. The processing elements 541, 550, 551, 552 and 561 get $$\frac{Ni}{N} \times T$$

tokens. In a different embodiment, links or connections between neighboring processing elements i and j (e.g., $S_{551\text{-}541}$, $S_{551\text{-}550}$, $S_{551\text{-}552}$, $S_{551\text{-}561}$) have an associated strength levels (e.g., a parameter) $S_{ij}$ is between 0.0 and 1.0. A processing element, e.g., processing element $S_{551}$, can request (e.g., via the processing element management component 110) tokens from the neighbor with the highest strength level. The actual number of tokens exchanged (e.g., via the processing element component 110) can be the number of tokens requested (e.g., via the processing element management component 110) scaled (e.g., via the scaling component 202) by $S_{ij}$. If the token exchange results in an efficiency improvement for both processing elements, then $S_{ij}$ is increased (e.g., doubled), saturating at 1.0. If the token exchange results in an efficiency degradation for both processing elements, then $S_{ij}$ is decreased (e.g., halved), saturating at 0.0. Every time the operating system scheduler 502 schedules a new task in a processing element, the operating system scheduler 502 can also reset the strength level to 1.0 for all its associated links.

Figure 6:
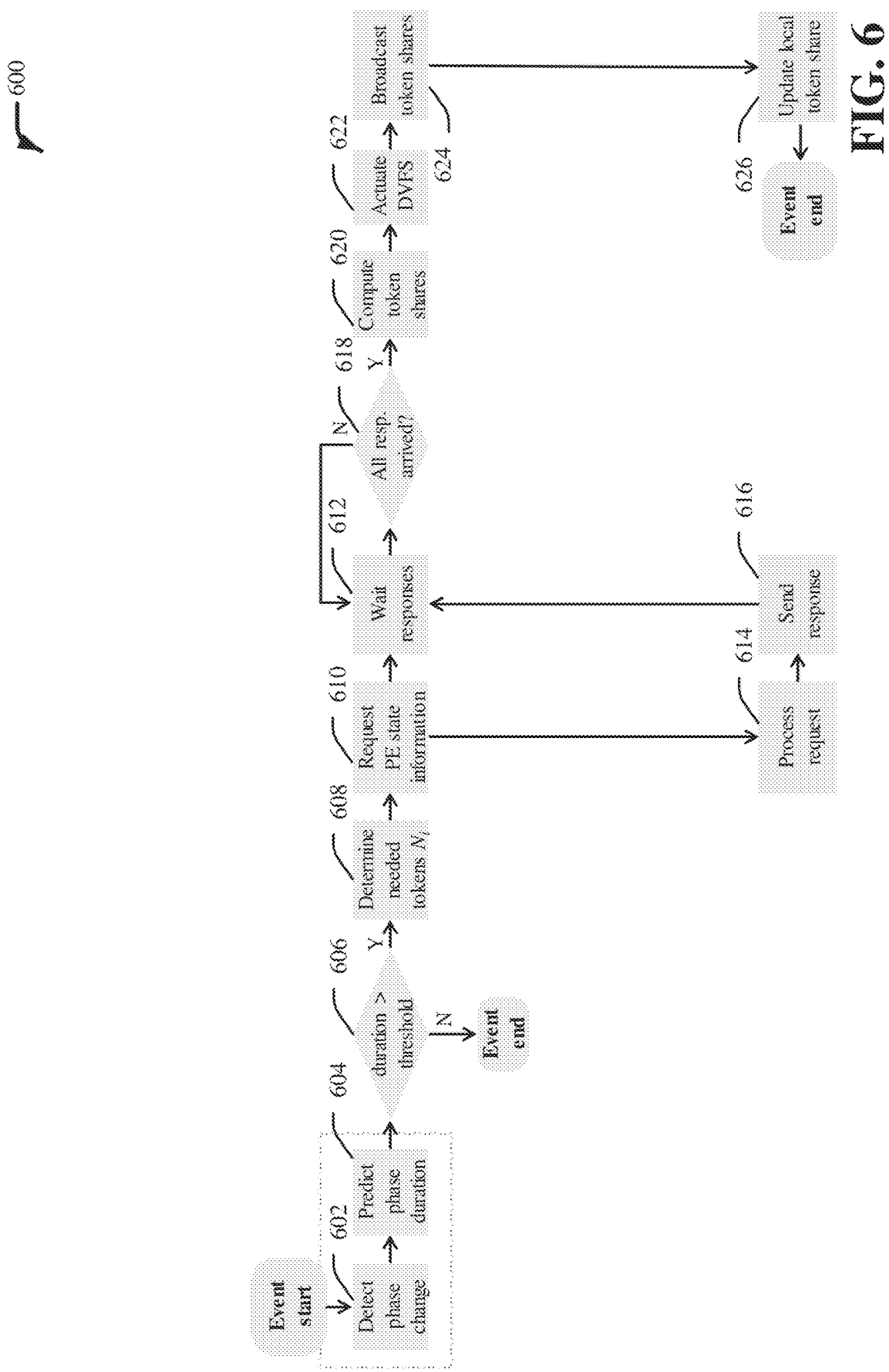
FIGS. 6-7 illustrate flow diagrams of example, non-limiting computer-implemented methods that facilitate management of resources in accordance with one or more embodiments described herein.

FIG. 6 illustrates a flow diagram of an example, non-limiting computer-implemented method 600 that facilitates management of resources in accordance with one or more embodiments described herein. At 602, the computer-implemented method 600 can comprise detecting (e.g., via the operating system scheduler 302) phase change (e.g., change of workload). At 604, the computer-implemented method 600 can comprise predicting (e.g., via the operating system scheduler 302) phase duration (e.g., duration of workload or resources needed). At 606, the computer-implemented method 600 can comprise determining (e.g., via the token allocation component 108) whether phase duration is greater than threshold. If no, event ends. If yes, at 608, the computer-implemented method 600 can comprise determining (e.g., via the token allocation component 108) needed tokens $N_i$. At 610, the computer-implemented method 600 can comprise requesting (e.g., via the processing element management component 110) by the requester processing element ($PE_i$) the processing element state information of responder processing element ($PE_j$) for neighboring processing elements. At 612, the computer-implemented method 600 can comprise waiting (e.g., via the processing element management component 110) by the requester $PE_i$ for responses. At 614, the computer-implemented method 600 can comprise processing (e.g., via the processing element management component 110) by responder $PE_j$ the request. At 616, the computer-implemented method 600 can comprise sending (e.g., via the processing element management component 110) by the responder $PE_j$ the response. At 618, the computer-implemented method 600 can comprise determining (e.g., via the processing element management component 110) whether all the responses arrived. If no, the process continues at 612. If yes, the process proceeds to 620. At 620, the computer-implemented method 600 can comprise computing (e.g., via the processing element management component 110) token shares. At 622, the computer-implemented method 600 can comprise actuating (e.g., via the scaling component 202) dynamic voltage and frequency scaling (DVFS). At 624, the computer-implemented method 600 can comprise broadcasting (e.g., via the processing element management component 110) token shares. At 626, the computer-implemented method 600 can comprise updating (e.g., via the processing element management component 110) local token share.

Figure 7:
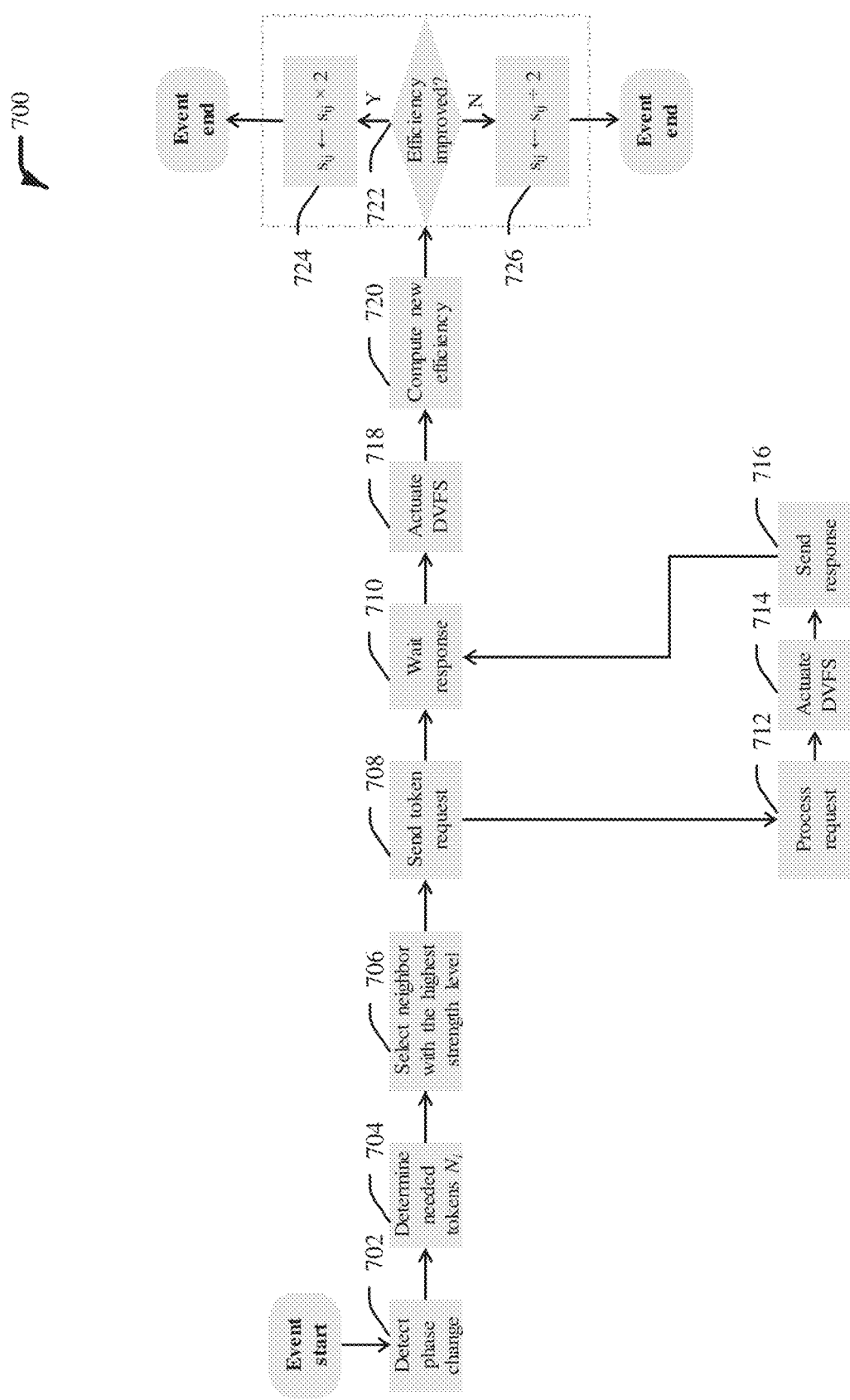

FIG. 7 illustrates a flow diagram of an example, non-limiting computer-implemented method 700 that facilitates management of resources in accordance with one or more embodiments described herein. At 702, the computer-implemented method 700 can comprise detecting (e.g., via the operating system scheduler 302) phase change (e.g., change of workload). At 704, the computer-implemented method 700 can comprise determining (e.g., via the token allocation component 108) needed tokens $N_i$. At 706, the computer-implemented method 700 can comprise selecting (e.g., via the processing element management component 110) a neighboring processing element with the highest strength level $S_{ij}$. At 708, the computer-implemented method 700 can comprise sending (e.g., via the processing element management component 110) by requester $PE_i$ token request. At 710, the computer-implemented method 700 can comprise waiting (e.g., via the processing element management component 110) by requester $PE_i$ for a response. At 712, the computer-implemented method 700 can comprise processing (e.g., via the processing element management component 110) by the responder $PE_j$ the request. At 714, the computer-implemented method 700 can comprise actuating (e.g., via the scaling component 202) DVFS. At 716, the computer-implemented method 700 can comprise sending (e.g., via the processing element management component 110) by the responder $PE_j$ the response. At 718, the computer-implemented method 700 can comprise actuating (e.g., via the scaling component 202) DVFS. At 720, the computer-implemented method 700 can comprise computing (e.g., via the processing element management component 110) new efficiency (e.g., benefits obtained by the set of processing elements that exchanged the one or more tokens). At 722, the computer-implemented method 700 can comprise determining (e.g., via the processing element management component 110) whether efficiency has improved. If yes, at 724, the computer-implemented method 700 can comprise learning (e.g., via the token allocation component 108 using models), the token allocation that resulted in doubling $S_{ij}$. If no, at 726, the computer-implemented method 700 can comprise learning (e.g., via the token allocation component 108 using models), the token allocation that resulted in halving $S_{ij}$.

Figure 8:
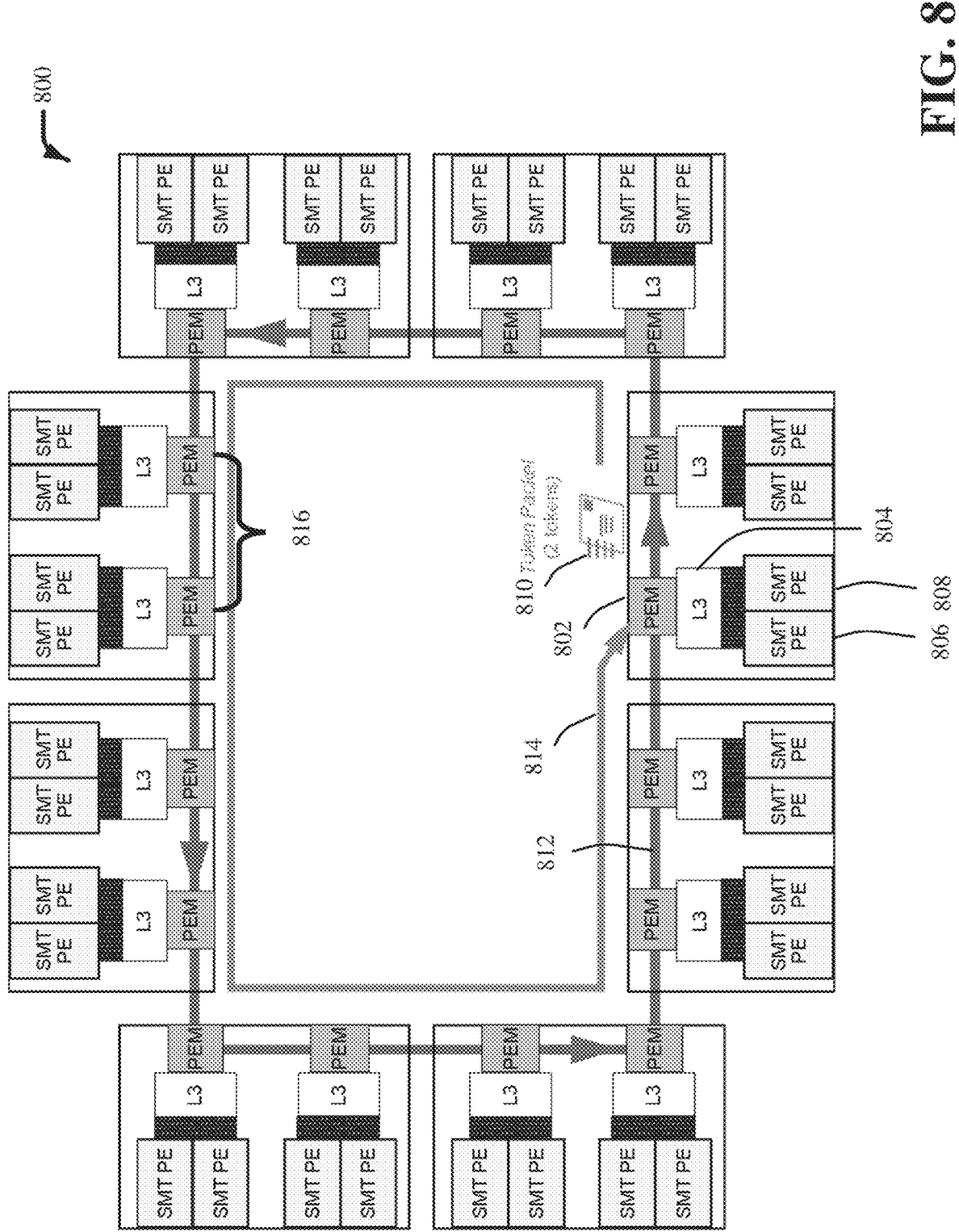
FIG. 8 illustrates a block diagram of an example, non-limiting ring interconnect in accordance with one or more embodiments described herein.

FIG. 8 illustrates a block diagram of an example, non-limiting ring interconnect 800 in accordance with one or more embodiments described herein. The processing element management component 802 can administer (e.g., request or send) tokens locally through example, non-limiting ring interconnect 800. The number of tokens at a processing element management component 802 can determine the attainable P-state. The higher the number of tokens, the higher the frequency-voltage pair that can be set. The processing element management component (PEM) 802 can have two associated values: $T_{available}$ and $T_{needed}$. $T_{available}$ can be the number of tokens available at the PEM 802. $T_{needed}$ can be the number of tokens needed by the PEM 802. In the example, non-limiting ring interconnect 800, all PEMs are interconnected in a ring configuration. If a PEM needs addition tokens, it can insert a request in the ring. As the request travels though the ring, other PEMs can contribute spare tokens. If needed, any PEM in between can take tokens from the ring and not necessarily the PEM that requested the tokens. The power consumption never surpasses the total number of tokens, while token exchange facilitates power shifting between simultaneous multithreading processing elements (SMT PEs) (e.g., processing elements 104).

A processing element management component PEM 802 (e.g., processing element management component 110) can be employed by one or multiple SMT PEs (e.g., processing elements 104). In FIG. 8, PEM 802 is employed by SMT PE 806 and 808, which are connected to L3 cache 804, a memory bank. The PEM 802 can send a positive payload token packet (not shown) through ring 812 to request for two tokens. If a payload is positive, the token packet is a token request. If the payload is negative, the token packet contains spare tokens. Multiple token requests can be aggregated in a single token packet so that only one token packet circulates across the ring at any point in time. Negative payload token packet 810 with two tokens in response to the positive payload token packet requesting two tokens can take as many cycles around ring 814 as the number of hops (e.g., hop 816) for the negative payload token packet 810 to arrive to PEM 802 which requested them. This also assumes that no other PEMs have taken them in between.

The operating system or hypervisor (not shown) (e.g., operating system scheduler 302) can request a P-state change on a SMT PE. If this is a request to go to a higher-level P-state (e.g., lower frequency-voltage), then the PEM can honor the change immediately with no need for token exchange. If this is a request to go to a lower-level P-state (e.g., higher frequency-voltage), then the PEM has to first get the additional needed tokens, if the current number of tokens is not enough. The operating system or hypervisor can also request that a SMT PE be placed into a lower power idle state (e.g., stop state). The operating system or hypervisor can override (e.g., increase or decrease) the total number of tokens available in the processor. This can be equivalent to increasing or decreasing the processor-level power cap. This is also easily implemented with a special type of token packet (e.g., with a negative token count as payload). The operating system or hypervisor can also override the current distribution of tokens across the PEMs. For example, the operating system or hypervisor can override the current distribution of tokens across the PEMs if a process running on a SMT PE needs more tokens but it cannot get enough and this is a critical process.

The operating system or hypervisor can request a P-state change on a SMT PE to a higher level P-state (e.g., lower frequency-voltage). The PEM can honor the change immediately with no need for token exchange. After increasing the P-state (e.g., reducing frequency-voltage), the PEM can increase $T_{available}$ with the number of remaining tokens. If the PEM controls (e.g., employed by) more than one PEMs, then $T_{available}$ may be allocated to other SMT PEs in need.

The operating system or hypervisor can request a P-state change on a SMT PE to a lower level P-state (e.g., higher frequency-voltage). If $T_{available}$ is enough to satisfy the SMT PE's request, then the PEM can honor the change immediately with no need for token exchange. If $T_{available}$ is not enough, then $T_{needed}$ is set accordingly so the needed tokens can be either grabbed from the coming token packet or the request can be included in the token packet. In the meantime, and if the PEM controls (e.g., employed by) more than one SMT PEs, the PEM may decide to redistribute tokens across SMT PEs in a fairer manner (e.g., based on needs).

A SMT PE level C-state (e.g., idle state) request can work similar to a P-state change to a higher level P-state. That is, after switching the SMT PE to a lower-power idle state, the remaining tokens can be added to $T_{available}$ in the PEM.

Figure 9:
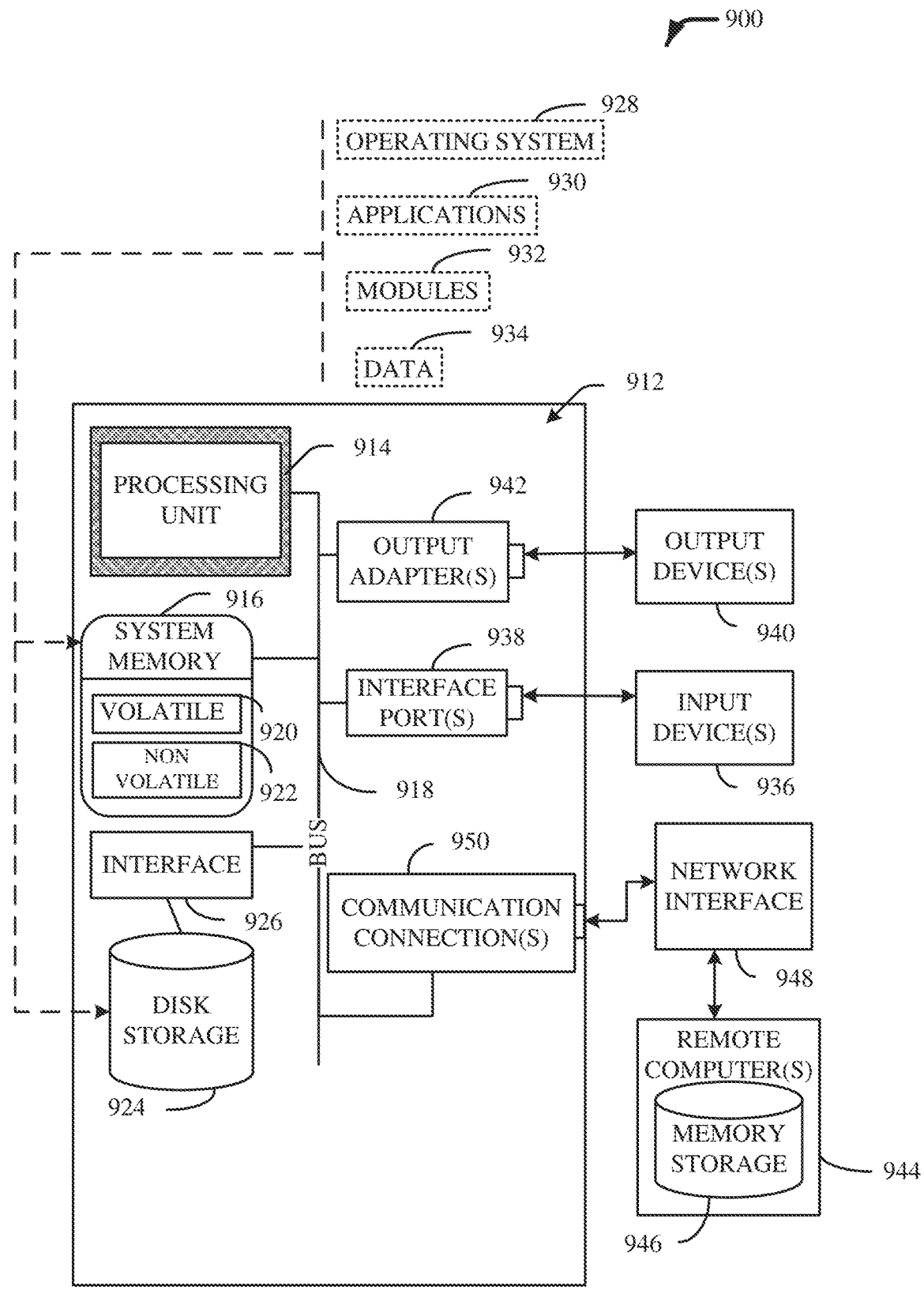
FIG. 9 illustrates a block diagram of an example, non-limiting operating environment in which one or more embodiments described herein can be facilitated.

In order to provide a context for the various aspects of the disclosed subject matter, FIG. 9 as well as the following discussion are intended to provide a general description of a suitable environment in which the various aspects of the disclosed subject matter can be implemented. FIG. 9 illustrates a block diagram of an example, non-limiting operating environment in which one or more embodiments described herein can be facilitated.

Repetitive description of like elements employed in other embodiments described herein is omitted for sake of brevity. With reference to FIG. 9, a suitable operating environment 900 for implementing various aspects of this disclosure can also include a computer 912. The computer 912 can also include a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914. The system bus 918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 916 can also include volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 920 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 912 can also include removable/non-removable, volatile/non-volatile computer storage media. FIG. 9 illustrates, for example, a disk storage 924. Disk storage 924 can also include, but is not limited to, devices like a magnetic disk drive, floppy disk drive, tape drive, Jaz drive, Zip drive, LS-100 drive, flash memory card, or memory stick. The disk storage 924 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 924 to the system bus 918, a removable or non-removable interface is typically used, such as interface 926. FIG. 9 also depicts software that acts as an intermediary between users and the basic computer resources described in the suitable operating environment 900. Such software can also include, for example, an operating system 928. Operating system 928, which can be stored on disk storage 924, acts to control and allocate resources of the computer 912. System applications 930 take advantage of the management of resources by operating system 928 through program modules 932 and program data 934, e.g., stored either in system memory 916 or on disk storage 924. It is to be appreciated that this disclosure can be implemented with various operating systems or combinations of operating systems. A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port can be used to provide input to computer 912, and to output information from computer 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a computer, a server, a router, a network PC, a workstation, a microprocessor based appliance, a peer device or other common network node and the like, and typically can also include many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 950 refers to the hardware/software employed to connect the network interface 948 to the system bus 918. While communication connection 950 is shown for illustrative clarity inside computer 912, it can also be external to computer 912. The hardware/software for connection to the network interface 948 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an IC, an application specific IC (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a plurality of processing elements;
    wherein a first processing element of the plurality of processing elements is configured to:
        employ at least one model to predict a token need of the first processing element during execution of a workload;
        send, to at least one second processing element of the plurality of processing elements, at least one token request for one or more tokens from the at least one second processing element as a function of the token need, wherein the first processing element selects the at least one second processing element that shares with the first processing element commonality of execution of the workload having an associated strength level; and
        in response to receiving at least one token response comprising at least one token from the at least one second processing element, increase utilization of a resource of the system associated with the at least one token, within an available quantity of the resource defined by the at least one token, wherein a quantity of tokens determines an attainable operational state, and a higher quantity of the tokens corresponds to a higher available frequency-voltage pair setting.

2. The system of claim 1, wherein the at least one token response comprising the at least one token improves at least one of power efficiency, temperature or system reliability of the system.

3. The system of claim 1, wherein the first processing element is further configured to measure a benefit to the system obtained by the increased utilization of the resource of the system associated with the at least one token.

4. The system of claim 1, wherein the at least one model comprises an artificial intelligence model.

5. The system of claim 1, wherein the at least one model comprises deep learning or swarm intelligence.

6. The system of claim 1, wherein the workload is a portion of program code.

7. The system of claim 1, wherein the first processing element is further configured to initiate reallocation of a set of tokens allocated to the first processing element based on detection of a new execution phase of the workload.

8. The system of claim 1, wherein the first processing is further configured to adjust at least one of a frequency setting or a voltage setting of the first processing element to increase the utilization of the resource.

9. The system of claim 1, wherein the plurality of processing elements are communicatively connected via a ring interconnect.

10. The system of claim 9, wherein the first processing element injects the at least one token request in the ring interconnect, and the at least one second processing element injects the at least one token response in the ring interconnect upon reception of the at least one token request.

11. A computer-implemented method, comprising:
    employing, by a first processing element of a system comprising a plurality of processing elements, at least one model to predict a token need of the first processing element during execution of a workload;
    sending, by the first processing element, to at least one second processing element of the plurality of processing elements, at least one token request for one or more tokens from the at least one second processing element as a function of the token need, wherein the first processing element selects the at least one second processing element that shares with the first processing element commonality of execution of the workload having an associated strength level; and
    in response to receiving at least one token response comprising at least one token from the at least one second processing element, increasing, by the first processing element, utilization of a resource of the system associated with the at least one token, within an available quantity of the resource defined by the at least one token, wherein a quantity of tokens determines an attainable operational state, and a higher quantity of the tokens corresponds to a higher available frequency-voltage pair setting.

12. The computer-implemented method of claim 11, wherein the at least one token response comprising the at least one token improves at least one of power efficiency, temperature or system reliability of the system.

13. The computer-implemented method of claim 11, further comprising measuring, by the first processing element, a benefit to the system obtained by the increased utilization of the resource of the system associated with the at least one token.

14. The computer-implemented method of claim 11, wherein the workload is a portion of program code.

15. A computer program product for facilitating management of resources, the computer program product comprising a computer readable storage medium having program instructions embodied therewith, the program instructions executable by a first processing element, of a system comprising a plurality of processing elements, to cause the first processing element to:
    employ at least one model to predict a token need of the first processing element during execution of a workload;
    send, to at least one second processing element of the plurality of processing elements, at least one token request for one or more tokens from the at least one second processing element as a function of the token need, wherein the first processing element selects the at least one second processing element that shares with the first processing element commonality of execution of the workload having an associated strength level; and
    in response to receiving at least one token response comprising at least one token from the at least one second processing element, increase utilization of a resource of the system associated with the at least one token, within an available quantity of the resource defined by the at least one token, wherein a quantity of tokens determines an attainable operational state, and a higher quantity of the tokens corresponds to a higher available frequency-voltage pair setting.

16. The computer program product of claim 15, wherein the workload is a portion of program code.

17. The computer program product of claim 15, wherein the program instructions are further executable to cause the first processing element to:
 measure a benefit to the system obtained by the increased utilization of the resource of the system associated with the at least one token.

18. The computer program product of claim 17, wherein the program instructions are further executable to cause the first processing element to:
 revise the at least one model based on the measured benefit.

19. A system, comprising:
 a plurality of processing elements;
 wherein a first processing element of the plurality of processing elements is configured to:
  employ at least one artificial intelligence model to predict a token need of the first processing element during execution of a workload; and
  send, to at least one second processing element of the plurality of processing elements that are directly connected to the first processing element, respective token requests for one or more tokens from the at least one second processing element as a function of the token need, wherein the first processing element selects the at least one second processing element that shares with the first processing element commonality of execution of the workload having an associated strength level; and
  in response to receiving at least one token response comprising at least one token from the at least one second processing element, increase utilization of a resource of the system associated with the at least one token, within an available quantity of the resource defined by the at least one token, wherein a quantity of tokens determines an attainable operational state, and a higher quantity of the tokens corresponds to a higher available frequency-voltage pair setting.

20. The system of claim 19, wherein the first processing element is further configured to determine the respective token requests for the one or more tokens from the at least one second processing element based on the function of the token need and respective strengths of respective direct connections of the at least one second processing element to the first processing element.

21. The system of claim 19, wherein the workload is a portion of program code.

22. The system of claim 19, wherein the system comprises a fixed quantity of tokens.

23. A computer-implemented method, comprising:
 employing, by a first processing element of a system comprising a plurality of processing elements, at least one artificial intelligence model to predict a token need of the first processing element during execution of a workload;
 sending, by the first processing element, to at least one second processing element of the plurality of processing elements, respective token requests for one or more tokens from the at least one second processing element as a function of the token need, wherein the first processing element selects the at least one second processing element that shares with the first processing element commonality of execution of the workload having an associated strength level; and
 in response to receiving at least one token response comprising at least one token from the at least one second processing element, increasing, by the first processing element, utilization of a resource of the system associated with the at least one token, within an available quantity of the resource defined by the at least one token, wherein a quantity of tokens determines an attainable operational state, and a higher quantity of the tokens corresponds to a higher available frequency-voltage pair setting.

24. The computer-implemented method of claim 23, further comprising determining, by the first processing element, the respective token requests for the one or more tokens from the at least one second processing element based on the function of the token need and respective strengths of respective direct connections of the at least one second processing element to the first processing element.

25. The computer-implemented method of claim 23, wherein the workload is a portion of program code.

* * * * *